(12) United States Patent
Mikhemar et al.

(10) Patent No.: US 12,512,859 B2
(45) Date of Patent: Dec. 30, 2025

(54) CANCELLATION TECHNIQUE FOR SECOND HARMONIC DISTORTION AND SPECTRAL IMAGE IN DACS AND DIGITAL TRANSMITTERS

(71) Applicant: Avago Technologies International Sales Pte. Limited, Singapore (SG)

(72) Inventors: Mohyee Mikhemar, Aliso Viejo, CA (US); Alvin Lai Lin, Andover, MA (US); Ahmed Sayed, Irvine, CA (US); Wei-Hong Chen, Irvine, CA (US); Sudharshan Srinivasan, Bangalore (IN); Arya Behzad, Los Altos, CA (US); Andrew J. Blanksby, Lake Oswego, OR (US); Tirdad Sowlati, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 436 days.

(21) Appl. No.: 18/139,250

(22) Filed: Apr. 25, 2023

(65) Prior Publication Data

US 2024/0361425 A1    Oct. 31, 2024

(51) Int. Cl.
*H04B 1/00* (2006.01)

(52) U.S. Cl.
CPC ................... *H04B 1/0025* (2013.01)

(58) Field of Classification Search
CPC .................................... H04B 1/0025

USPC ........................................... 375/295
See application file for complete search history.

(56) References Cited

U.S. PATENT DOCUMENTS

| 2003/0151442 A1 | 8/2003 | Strzalkowski |
| 2015/0248966 A1 | 9/2015 | Morokuma et al. |
| 2024/0128975 A1 | 4/2024 | Ojika et al. |

FOREIGN PATENT DOCUMENTS

CN        CP117319885 A    * 12/2023    ............... H04R 3/04

OTHER PUBLICATIONS

European Extended Search Report on EP Appln No. 24172155.4 dated Aug. 30, 2024.

* cited by examiner

*Primary Examiner* — Dominic D Saltarelli
(74) *Attorney, Agent, or Firm* — Foley & Lardner LLP

(57) ABSTRACT

A device includes a port and a transformer. The transformer includes a first coil that has a first node and a second node and a second coil that is coupled to the output port. The device also includes a pulse generator coupled to the first node to generate two or more pulses with a first period on the first node and a delay module that is coupled between the second node of the first coil and the pulse generator. The delay module is generates a time delay to the two or more pulses of the pulse generator before the two or more pulses are delivered to the second node. The second coil provides a signal at the port.

20 Claims, 10 Drawing Sheets

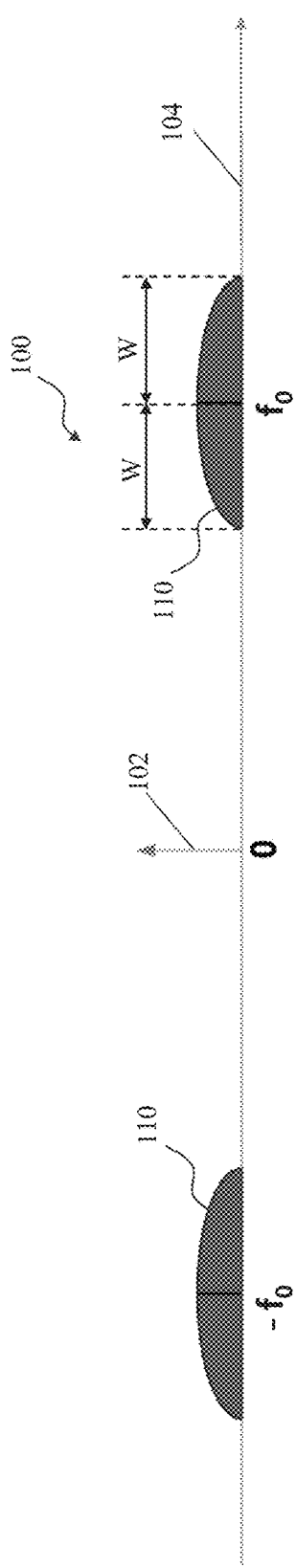

CANCELLATION TECHNIQUE FOR SECOND HARMONIC DISTORTION AND SPECTRAL IMAGE IN DACS AND DIGITAL TRANSMITTERS

TECHNICAL FIELD

The present description relates generally to an interface of a transmitter, in particular, to sampling of a narrowband signal for transmission.

BACKGROUND

Reconstruction of an original signal that is sampled may require applying a reconstruction filter on the sampled the original signal. If the original signal includes frequency components in the Gigahertz (GHz) range, constructing a sharp reconstruction filter in the GHz range is difficult and costly, and part of the higher frequencies may pass the reconstruction filter and be added to the reconstructed signal. It is highly desirable to diminish out-of-band frequency components of the sampled original signal to relax the requirement for a sharp reconstruction filter.

BRIEF DESCRIPTION OF THE DRAWINGS

Certain features of the subject technology are set forth in the appended claims. However, for purposes of explanation, several aspects of the subject technology are depicted in the following figures.

FIGS. 1A and 1B illustrate a frequency spectrum of a narrowband signal and the frequency spectrum of a sampled narrowband signal.

DETAILED DESCRIPTION

Figure 2A:
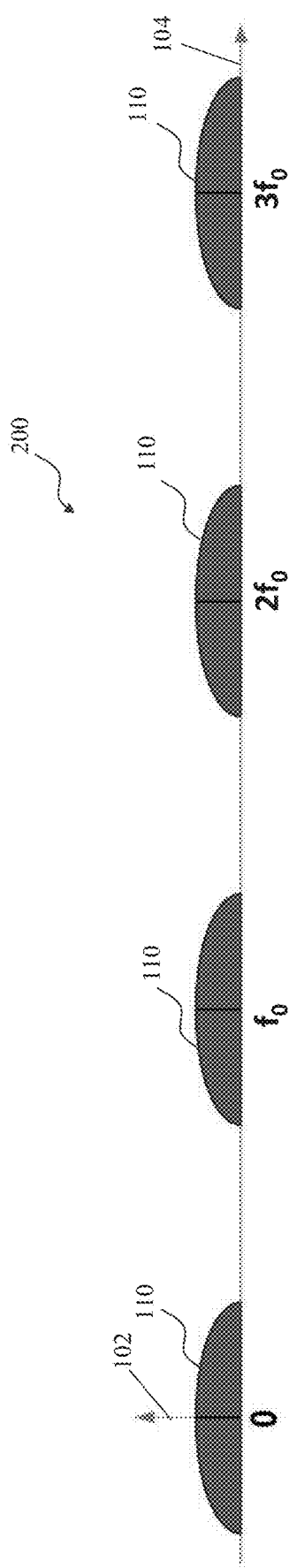
FIGS. 2A and 2B illustrate the frequency spectra of the sampled narrowband signal and a reconstruction filter.

The detailed description set forth below is intended as a description of various configurations of the subject technology and is not intended to represent the only configurations in which the subject technology may be practiced. The appended drawings are incorporated herein and constitute part of the detailed description, which includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

In high speed communication a narrowband signal at frequencies above 1 GHz, e.g., at a frequency $f_0$ about 2.5 GHz, is sampled and transmitted. In some embodiments, the frequency content around the frequency $f_0$ has a bandwidth of 2W such that $f_0 > W$ and, thus, the signal is a narrowband signal with no low frequency or DC components. In some embodiments, although the Nyquist rate $f_S$ is $f_S = 2f_0 + 2W$, because the narrowband signal has no low frequency or DC components, the narrowband signal is sampled at a sampling frequency $2f_0$, e.g., a sampling rate, which is a lower rate than the Nyquist rate $f_S$. Also, the narrowband signal may be reconstructed from the sampled narrowband signal at the sampling frequency $2f_0$. Using the sampling frequency $2f_0$ for sampling the narrowband signal, the concentration of frequency components of the sampled narrowband signal are $2f_0$ or around 5 GHz apart and there is no DC component such that the frequency components are centered around $f_0$, $3f_0$, $5f_0$, etc.

In some embodiments, the narrowband signal does not have DC or near DC components such that $f_0 > 2W$ and the narrowband signal may be sampled and transmitted at the sampling frequency $f_0$ and, thus, considerable energy is saved for transmitting fifty percent less samples. Also, the narrowband signal may be reconstructed from the sampled narrowband signal at the sampling frequency $f_0$, however, the concentration of frequency components of the sampled narrowband signal may be $f_0$ or 2.5 GHz apart and there is a DC component. Therefore, a sharp bandpass reconstruction filter is needed when using the sampling frequency $f_0$ because distorting frequency components are around DC and are around the frequency $2f_0$ that are required to be filtered out. In addition, a device and method is suggested below that reduces the frequency components around the frequency $2f_0$ and allows the bandpass reconstruction filter to be less sharp towards the higher frequencies. In some embodiments, 2W is much smaller than the frequency $f_0$.

FIGS. 1A and 1B illustrate a frequency spectrum of a narrowband signal and the frequency spectrum of a sampled narrowband signal. FIG. 1A shows a frequency spectrum 100 of a narrowband signal that includes frequency components 110 that are concentrated around frequencies $+f_0$ and $-f_0$. As shown, the frequency spectrum 100 is show on an amplitude coordinate 102 versus a frequency coordinate 104. As shown, the frequency components, e.g., the frequency content, around the frequencies $+f_0$ and $-f_0$ have an extent of W at each side. In some embodiments, the extent W is smaller than $f_0$, e.g., at least twice smaller than $f_0$. As discussed above, the Nyquist rate $f_S$ for the narrowband signal is $f_S = 2f_0 + 2W$. FIG. 1B shows the frequency spectrum 150 of the sampled narrowband signal on the amplitude coordinate 102 versus the frequency coordinate 104 that is sampled at the sampling frequency $2f_0$ or 5 GHz. As shown, the frequency spectrum 150, includes multiple frequency spectra 100 that repeats with $2f_0$ steps. Thus, the narrowband signal may be reconstructed from the sampled narrowband signal using a lowpass filter with a bandwidth of about $f_0 + W$ that does not require to be sharp.

Figure 2B:
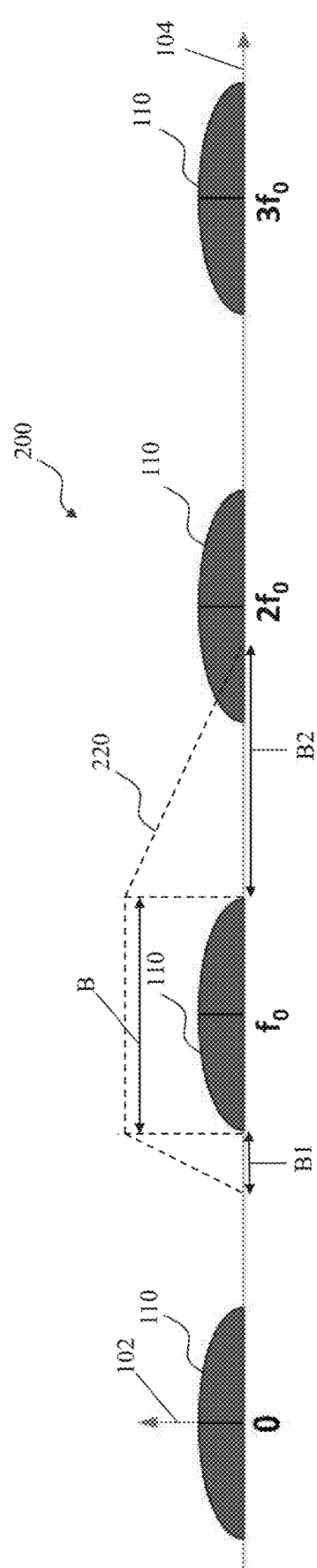

FIGS. 2A and 2B illustrate the frequency spectra of the sampled narrowband signal at $f_0$ rate and a reconstruction filter. FIG. 2A shows a frequency spectrum 200 of the sampled narrowband signal on the amplitude coordinate 102 versus the frequency coordinate 104 when the narrowband signal is sampled at the frequency $f_0$. As shown in FIG. 2A, the frequency spectrum 100 repeats with $f_0$ steps. Also, the frequency components 110 repeat with $f_0$ steps. FIG. 2B shows the frequency spectrum 200 of FIG. 2A with an amplitude 220 of a reconstruction bandpass filter for reconstructing the narrowband signal. The reconstruction bandpass filter has a flat band with extent B greater than or equal to 2W, a first transition band with extent B1 toward the DC frequency, and a second transition band with extent B2 toward high frequencies. In some embodiments, it is easier to make B1 small than to make B2 small. The reconstruction bandpass filter can be made less sharp toward high frequencies if frequency components 110 around $2f_0$ is diminished, e.g., drastically reduced or minimized, such that a signal to noise ratio (SNR) of the reconstructed narrowband signal is better than 30 dB when an amplitude of the extent B2 goes down with a slope of 40 dB per decade. In some embodiments, the extent $B1<f_0-2W$. In some embodiments, $B1<<f_0$. Returning to FIGS. 1B and 2A, because the sampling is not ideal, the amplitude of frequency components 110 is not constant for all frequencies $f_0$, $2f_0$, $3f_0$, etc. The amplitude of frequency components 110 is reduced toward the high frequencies.

Figure 3A:
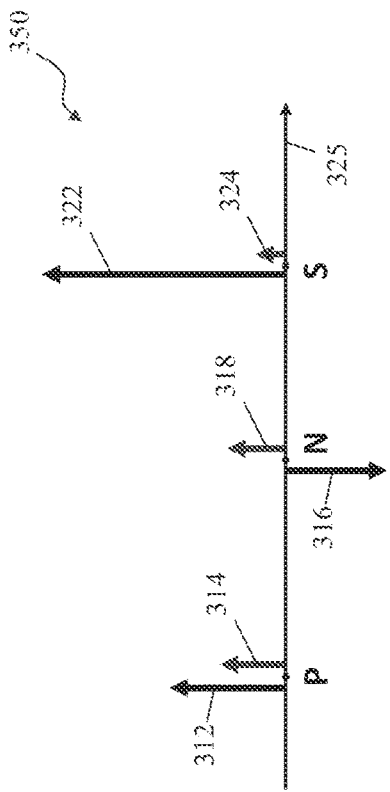
FIGS. 3A, 3B, and 3C illustrate a transmitter interface, frequency components at different locations of the transmitter interface, and a transmission system that includes the transmitter interface, according to various aspects of the subject technology.
Figure 3B:
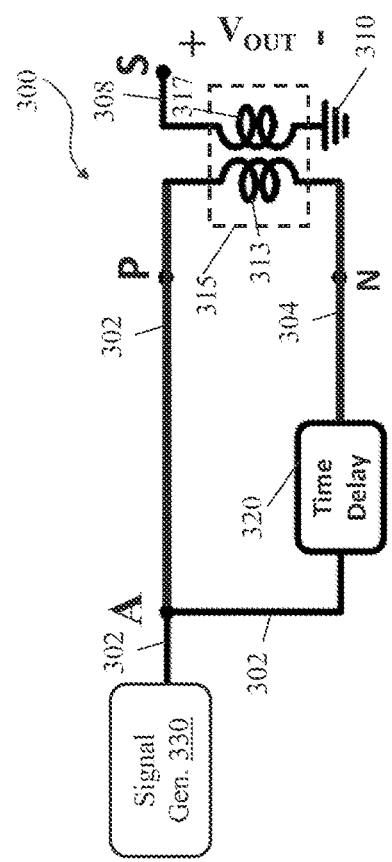
Figure 3C:
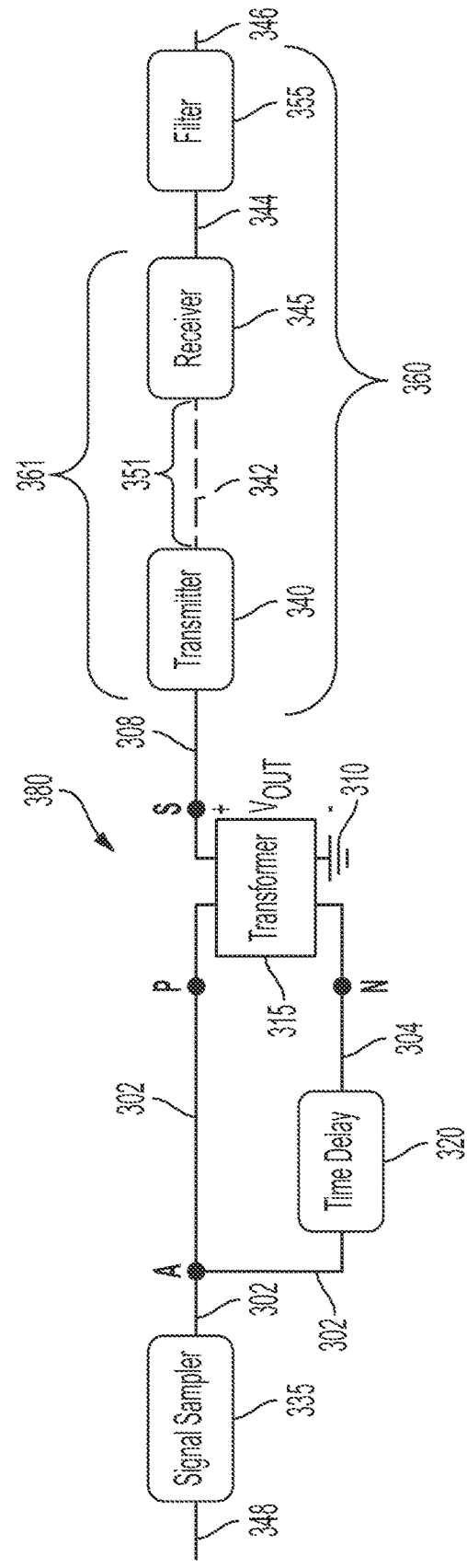

FIGS. 3A, 3B, and 3C illustrate a transmitter interface, frequency components at different locations of the transmitter interface, and a transmission system that includes the transmitter interface, according to various aspects of the subject technology. FIG. 3A shows a transmitter interface 300 that includes a signal generator 330. The signal generator 330 may generate sampled signals. In some embodiments, the signal generator 330 is a pulse generator and the sampled signals may be a plurality of sampled pulses generated by the pulse generator. The plurality of sampled signals 302 are delivered to a node A. At the node A, the plurality of sampled signals 302 are delivered via two paths to a transformer 315. First, the plurality of sampled signals 302 are delivered to a positive node P of a primary coil 313, e.g., a first coil, of the transformer 315. Second, the plurality of sampled signals 302, e.g., a plurality of samples pulses, are sent to a delay module 320, e.g., a delay generator, to apply a time delay in the sampled signals 302, e.g., apply a time delay to the plurality of sampled pulses. In some embodiments, the primary coil includes a first node and a second node, e.g., a first connection point and a second connection point, where a connection line connects to the primary coil. In some embodiments, the first node is the positive node P and the second node is a negative node N. In some embodiments, the pulse generator is coupled to the positive node P and produces a plurality of, e.g., two or more, pulses with a sampling period $T_0$, e.g., a first period. In some embodiments, the sampling period $T_0$ is between about 50 Pico seconds (Ps) and 500 Ps.

In some embodiments, the sampling frequency, e.g., the sampling rate, is $f_0$ and the sampling period is $T_0=1/f_0$ and the delay module provides a time delay of $T_0/2$, which is equal to a half of the sampling period $T_0$. The time delay of $T_0/2$ or an odd multiple of $T_0/2$ is applied to the plurality of sampled signals 302, e.g., two or more pulses, and generates a plurality of delayed sampled signals 304, e.g., delayed two or more pulses, which are delivered to the negative node N of the primary coil 313 of the transformer 315. The transformer has a secondary coil 317, e.g., a second coil, with a node of the secondary coil 317 that is coupled to a ground node 310. Another node of the secondary coil 317 is a main output node S that provides the signal 308, which is proportional to the plurality of delayed sampled signals 304 subtracted from the plurality of sampled signals 302. In some embodiments, the transformer 315 is one to one and, thus, the signal 308 is the plurality of delayed sampled signals 304 subtracted from the plurality of sampled signals 302. In some embodiments, a main output port between the main output node S and the ground node 310 provides an output voltage $V_{out}$. In some embodiments, the secondary coil includes a first node and a second node, where a connection line connects to the primary coil. In some embodiments, the first node is the positive node P and the second node is the negative node N. In some embodiments, the time delay for generating the plurality of delayed sampled signals 304 is selected such that a frequency component of the sampled signal at twice the sampling frequency, e.g., at $2f_0$, is diminished, e.g., minimized.

FIG. 3B shows a plot 350 of frequency content at the main output node S at one end of the secondary coil 317 of the transformer 315, the positive node P, and the negative node N at both ends of the primary coil 313 of the transformer 315. The plot 350 is shown on a coordinate 325, which shows the locations. The coordinate 325 only distinguishes the negative node N, the positive node P, and the main output node S and the plot 350 shows the magnitude of the frequency components at each node. The frequency components 312, 316, and 322 are proportional to frequency components at $f_0$ and the frequency components, e.g., magnitude of the frequency components, 314, 318, and 324 are proportional to frequency components at $2f_0$. As shown, the frequency components 312 and 316 have opposite signs and when subtracted the amplitudes are added, e.g., summed, and becomes a first frequency component 322 at the main output node S. The frequency components 314 and 318 have same signs and when subtracted the amplitudes are subtracted and becomes a second frequency component 324 at the main output node S and a residue remains. In some embodiments, an energy of the first frequency component 322 to the energy of the second frequency component 324 is greater by a factor between about 50 and 100. The delay of $T_0/2$ generates a linear phase in the spectrum such that the phase becomes 180 degrees (a negative sign) at the frequency $f_0$ and becomes 360 degrees (a positive sign) at the frequency $2f_0$. Thus, the first frequency component 322 and the second frequency component 324 are parts of the signal 308, e.g., the voltage $V_{out}$.

FIG. 3C shows the transmission system 380, which is similar to FIG. 3A and includes the transformer 315 and the delay module 320, with the difference that the transmission system 380 includes a signal sampler module 335, instead of the signal generator 330, and additionally includes signal communication systems 360 and 361. In some embodiments, the input signal 348 is a narrow band signal having the frequency spectrum 100 of FIG. 1A with $f_0>2W$. In some embodiments, the signal sampler module 335 produces samples of the input signal 348 at sampling frequency $2f_0$ and provides a plurality of sampled signals having the frequency spectrum 150 of FIG. 1B. In some embodiments, the signal sampler module 335 produces samples of the input signal 348 at a sampling frequency $f_0$ and provides the plurality of sampled signals 302 having the frequency spectrum 200 of FIG. 2A. The signal sampler module 335 is described with respect to FIG. 6F and the sampled signals 302 are described with respect to FIGS. 6B, 6C, 6D, and 6E.

As shown, the transmission system 380 includes the signal communication system 361, which includes a transmitter 340, a transmission channel 351, and a receiver 345. In addition, the transmission system 380 shows the signal communication system 360 that includes the signal communication system 361 and a filter 355. The signal 308, which is generated by a subtraction of the plurality of delayed sampled signals 304 from the plurality of sampled signals 302, is transmitted, as a transmitted signal 342, via a transmitter 340 over the transmission channel 351. At a destination, the transmitted signal 342 is received and detected as a signal 344, which is proportional to the signal 308. The signal 344 is filtered using the filter 355, e.g., a reconstruction bandpass filter or a sharp reconstruction bandpass filter, to produce a signal 346, which is a reconstructed signal based on, e.g., from, the samples of the input signal 348 and is proportional to the input signal 348. The filtering is described with respect to FIG. 5B.

Figure 4A:
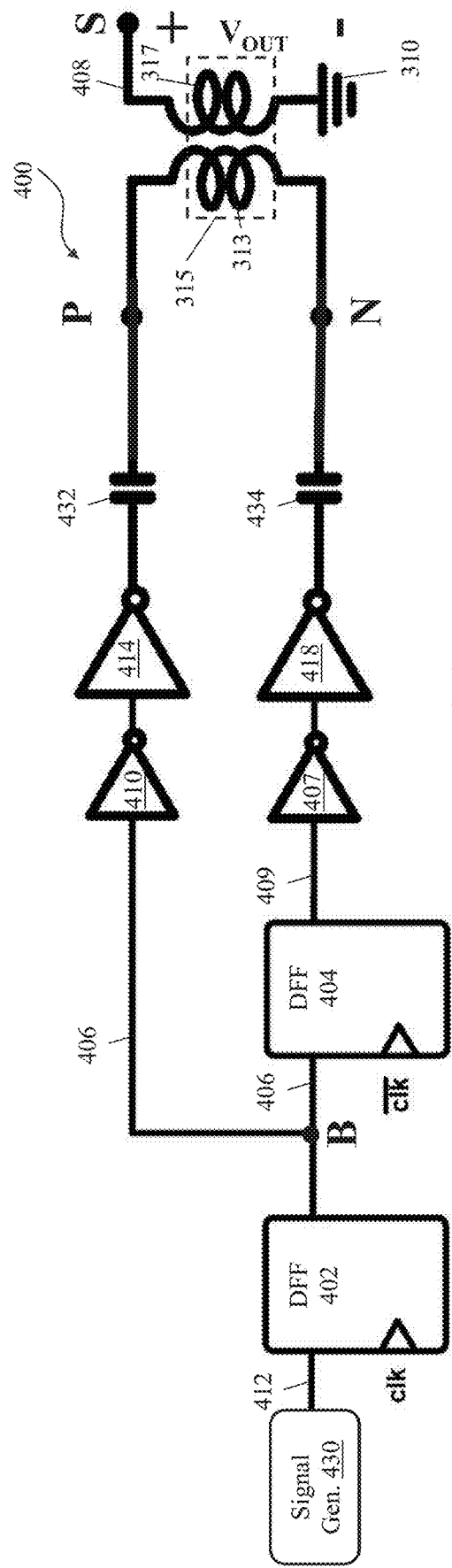
FIGS. 4A, 4B, and 4C illustrate a transmitter interface and transmission systems that include the transmitter interface, according to various aspects of the subject technology.
Figure 4B:
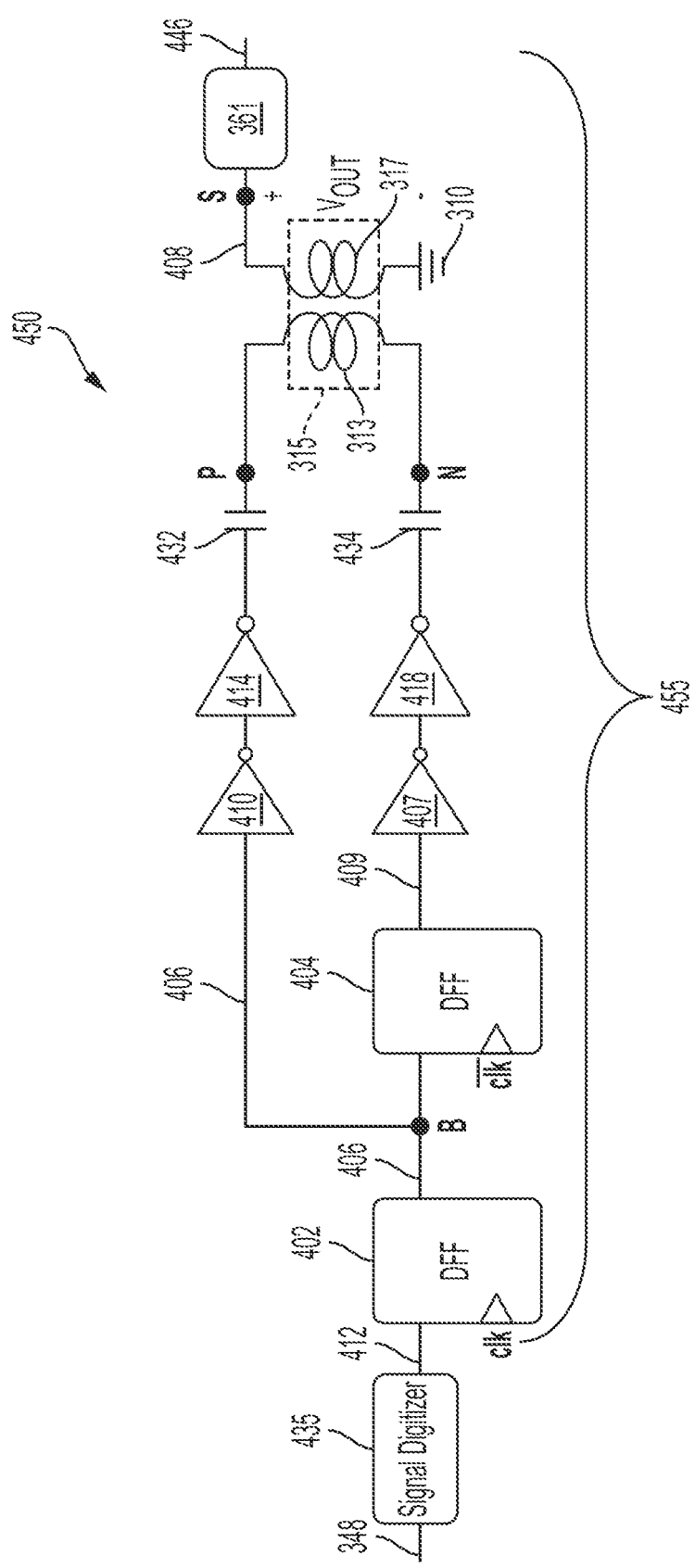
Figure 4C:
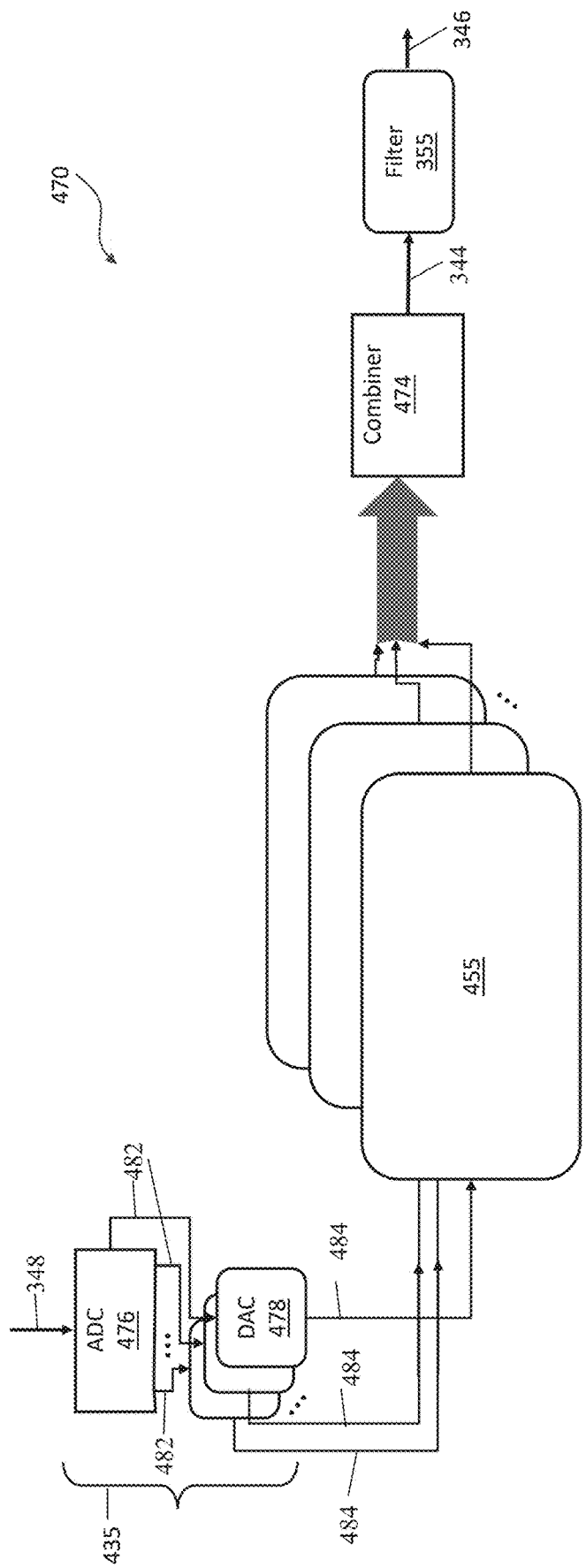

FIGS. 4A, 4B, and 4C illustrate a transmitter interface 400 and transmission systems 450 and 470 that include the transmitter interface, according to various aspects of the subject technology. FIGS. 4A and 4B are similar to FIGS. 3A and 3B. FIG. 4A includes a signal generator 430 to generate sampled signals 412, e.g., binary pulses, at the sampling frequency $f_0$ and a period $1/f_0$. FIG. 4B includes a signal digitizer 435 to receive the input signal 348 and to produce samples of the input signal 348, as binary pulses, at the sampling frequency $f_0$ and provides the plurality of sampled signals 412 as binary pulses. FIGS. 4A and 4B use a flip flop 402, e.g., a D flip flop (DFF), with a clock signal of frequency $f_0$ to synchronize the sampled signals 412 with a period of the frequency $f_0$. Then a plurality of synchronized sampled signals 406 is delivered to a node B. From node B, in a first path, the plurality of synchronized sampled signals 406 are delivered to a positive node P of a primary coil 313 of the transformer 315. In some embodiments, the first path includes two back to back NOT gates 410 and 414 to increase a current delivered to the positive node P and also includes a capacitor 432 to remove the DC bias of the plurality of synchronized sampled signals 406.

In addition, from the node B, in a second path, the plurality of synchronized sampled signals 406 are sent to a flip flop 404, e.g., a D flip flop, with a clock signal which is a complement of the clock signal of the flip flop 402. Thus, having a complement clock signal causes the flip flop 404 to generate a delay of $T_0/2$, where $T_0=1/f_0$ is a period of the clock frequency of the flip flop 402 and the flip flop 404. The flip flop 404 provides a plurality of delayed and synchronized sampled signals 409 to the negative node N of the primary coil 313 of the transformer 315. In some embodiments, the second path includes two back to back NOT gates 407 and 418 to increase a current delivered to the negative node N and also includes a capacitor 434 to remove the DC bias of the plurality of delayed and synchronized sampled signals 409. As shown, FIG. 4B includes the signal communication system 361 discussed above with regards to FIG. 3A. The transmitter interface 400 provides the output voltage $V_{out}$ of the main output port between the main output node S and the ground node 310 to the signal communication system 361 to provide the signal 446, which is proportional to a signal 408 at the main output node S. In some embodiments, the signal 446 passes through the filter 355 to produce a signal which is proportional to the input signal 348. FIG. 4B also shows a transmission system segment 455, which is the transmission systems 450 without the signal digitizer 435. In some embodiments, the transmission system 450 is a representative system for transmitting each bit of the input signal 348. FIG. 3C shows details of transmitting multiple bits of the input signal 348.

FIG. 4C shows the transmission system 470 that includes the signal digitizer 435, two or more transmission system segment 455 in parallel, a signal combiner module 474, and the filter 355. As shown, the signal digitizer 435 includes an analog to digital converter, e.g., an ADC 476, that samples the input signal 348 in constant intervals $T_o$ and quantizes the samples of the input signal 348 and digitizes the samples of the input signal 348. Thus, the ADC 476 generates a plurality of bits 482 at an output of the ADC 476 after each interval $T_o$. Each bit 482 is fed into a digital to analog converter, e.g., an DAC 478, to produce an analog signal, e.g., a rectangular binary pulse 484. The binary pulses 484 are transmitted via multiple parallel transmission system segments 455 such that each binary pulse, e.g., each bit of the samples of the input signal 348, is transmitted via a separate transmission system segment 455. As shown, the received binary pulses are combined by the signal combiner module 474 to generate the samples, e.g., the quantized samples, of the input signal 348, which are consistent with the signal 344 of FIG. 3C. The samples of the input signal 348 are filtered by the filter 355 to reconstruct the signal 346, which is proportional to the input signal 348. As described above, because of using the transmission system segment 455 that is used in FIGS. 3C, 4A, and 4B, the frequency components around twice the sampling frequency are reduced and the reconstruction filter 355 does not need to be sharp. In some embodiments, the input signal is either an in-phase (I) or a quadrature (Q) component of the input signal 348.

Figure 5A:
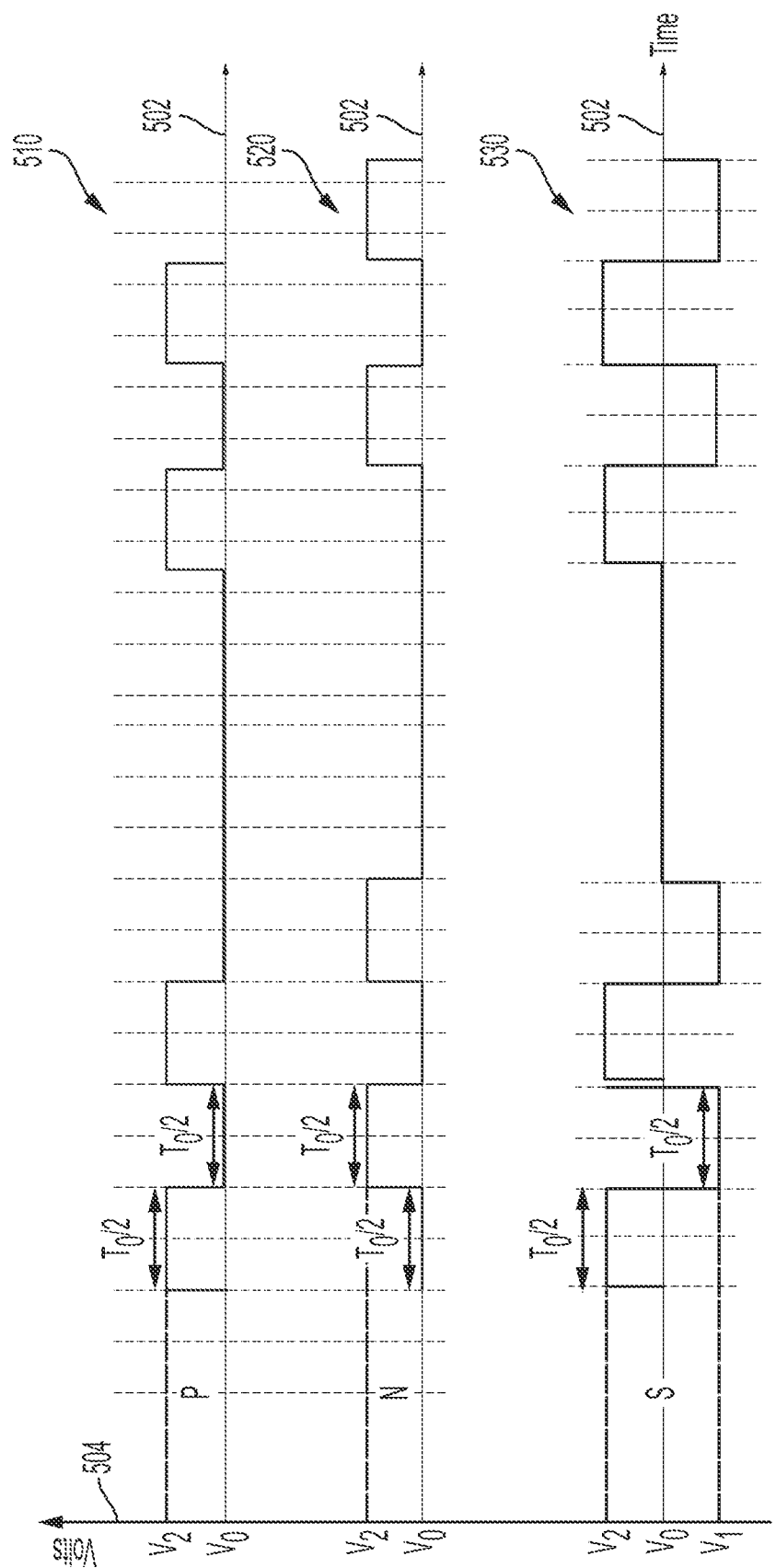
FIGS. 5A and 5B illustrate transmitter interface signals and the spectrum of the sampled narrowband signal at an output port of the transmitter interface, according to various aspects of the subject technology.
Figure 5B:
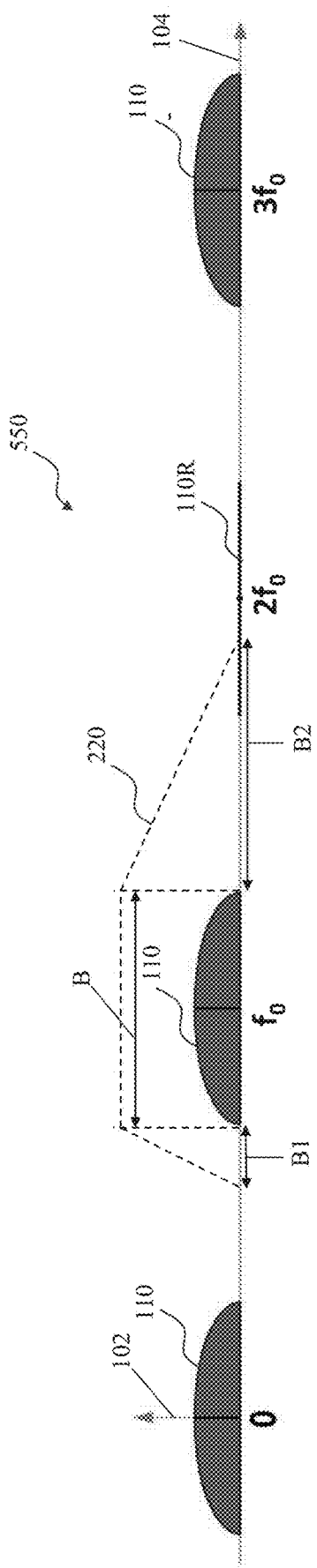

FIGS. 5A and 5B illustrate transmitter interface signals and the spectrum of the sampled narrowband signal at an output port of the transmitter interface, according to various aspects of the subject technology. FIG. 5A shows the signals at the negative node N, at the positive node P, and the main output node S on a voltage coordinate 504 versus time coordinates 502. In some embodiments, a signal or voltage $v_0$ is a logical zero, a signal or voltage $v_2$ is a logical one, and a signal or voltage $v_1$ is negative voltage with a magnitude equal to a logical one. As shown, a graph 520 of the voltage or signal at the negative node N is a shifted by half a period of a graph 510 of the voltage or signal at the positive node P. Also, as shown, a graph 530 of the voltage or signal at the main output node S the graph 520 subtracted from the graph 510. FIG. 5B shows a spectrum 550 of the output voltage $V_{out}$ of the main output port between the main output node S and the ground node 310 of FIG. 3A, 3B, 4A, or 4B. FIG. 5B is similar to FIG. 2B, however, an energy of the frequency components 110R around $2f_0$ is greatly reduced, e.g., by a factor between about 50 and 100, compared to FIG. 2B that the delay module 320 or the flip flop 404 was not used.

Figure 6A:
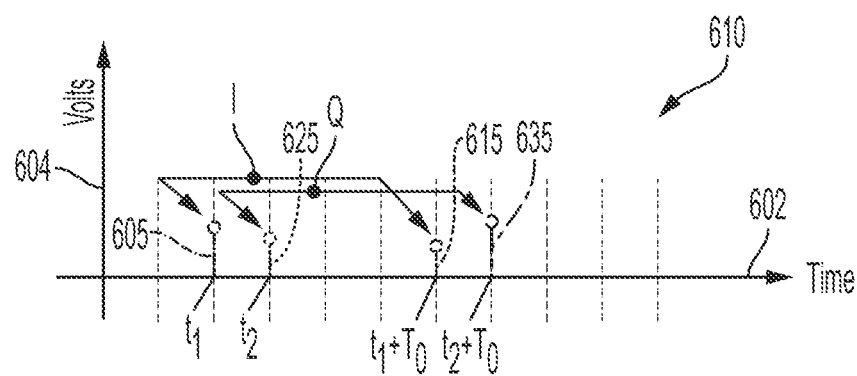
FIGS. 6A, 6B, 6C, 6D, 6E, and 6F illustrate sampled signals and the signal sampler module.

FIGS. 6A, 6B, 6C, 6D, 6E, and 6F illustrate sampled signals and the signal sampler module 335. FIG. 6A shows the samples 610 of a signal. In some embodiments, the sampled values 605 and 615 are samples of the I component and the sampled values 625 and 635 are samples of the Q component of the input signal 348. Both I and Q components are sampled every $T_o$ interval that is shown on a time coordinate 602. In some embodiments, the sample values are in volts that are shown on a voltage coordinate 604. As shown, the I component sampling starts at time $t_1$ and repeats at every interval $T_o$ thereafter and the Q component sampling starts at time $t_2$ and repeats at every interval $T_o$ thereafter. FIGS. 6B, 6C, 6D, and 6E are shown on the same time coordinate 602 and voltage coordinate 604. The pulse

Figure 6B:
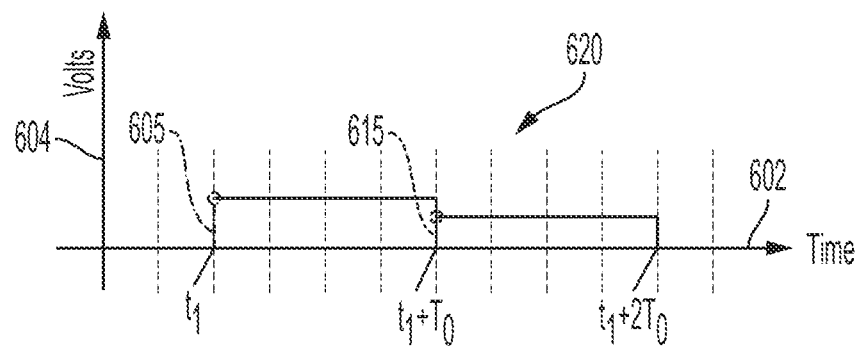
Figure 6C:
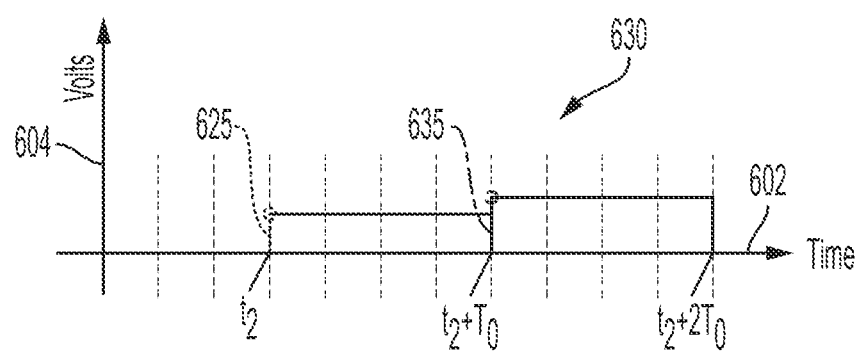

620 of FIG. 6B are the I component samples that are converted into analog pulses and the pulses 630 of FIG. 6C are the Q component samples that are converted into analog pulses. In some embodiments, the analog pulses are generated by the DAC 478 of FIG. 4C.

Figure 6D:
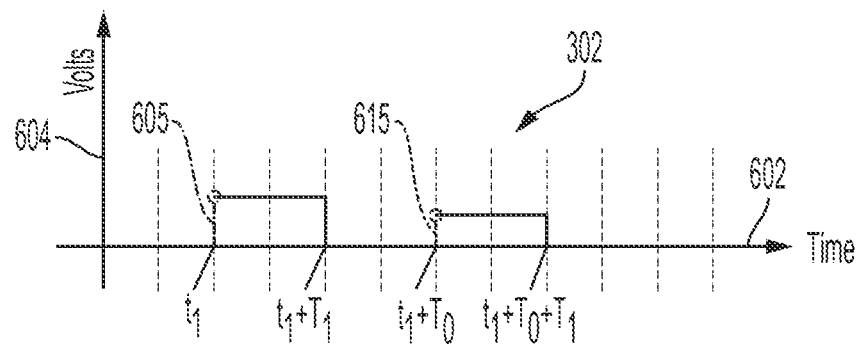
Figure 6E:
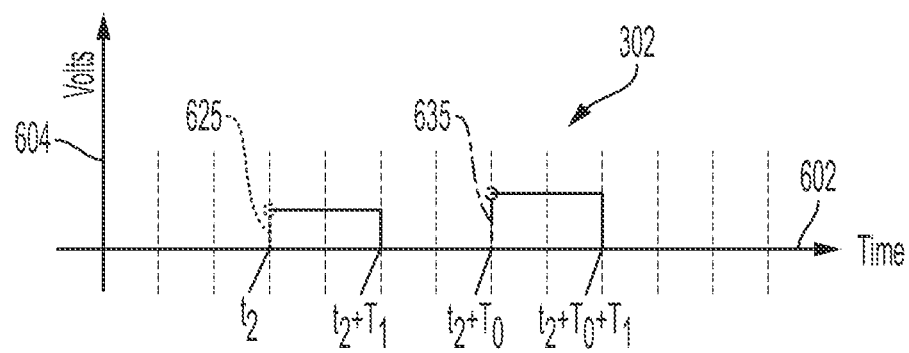

In some embodiments, the pulses are return to zero (RZ) pulses such that each sample value is converted to a pulse that stays at a high value, e.g., one volt or more, for an interval $T_1$ and then becomes zero and stays at zero until the end of the period $T_0$. In some embodiments, a duration $T_1$ the pulse stays at high value to a total duration of the pulse, e.g., period of the pulse, is a duty cycle $T_1/T_o$ of the pulse. In some embodiments, the duty cycle of the pulses 620 and 630 are fifty percent or more. The RZ pulses of FIGS. 6D and 6E are consistent with the sampled signals 302 of FIGS. 3A and 3C that have a value of the sampled signal and may have multiple values and, thus, are not binary pulses.

Figure 6F:
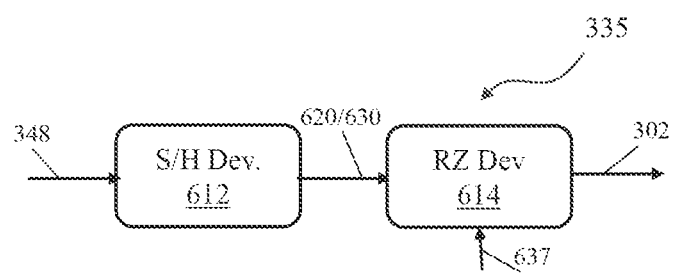

FIG. 6F shows an example of the signal sampler module 335 of FIG. 3C. The signal sampler module 335 includes a sample and hold device, e.g., an S/H device 612, that samples the input voltage and produces the pulses 620 and 630 of FIGS. 6B and 6C. The signal sampler module 335 further includes a return to zero device, e.g., an RZ device 614, that modifies the pulses 620 and 630 to go to zero and generates the sampled signals 302 from the pulses 620 and 630 of FIGS. 6B and 6C. In some embodiments, the RZ device 614 multiplies the pulses 620 and 630 with a periodic pulse 637 having the period $T_o$ and a height of one unit and the duty cycle of $T_1/T_o$.

The subject technology discussed above reduces the sampling frequency of a narrowband signal below the Nyquist rate without requiring very sharp reconstruction filters. The subject technology may be used for digital transmission and also for digital to analog converters.

According to aspects of the subject technology, a device includes a port and a transformer that includes a first coil that includes a first node and a second node and a second coil that is coupled to the port. The transmitter interface also includes a pulse generator that is coupled to the first node and the pulse generator generates two or more pulses with a first period at the first node. The transmitter interface further includes a delay module coupled between the second node of the first coil and the pulse generator. The delay module generates a delayed two or more pulses by applying a time delay to the two or more pulses of the pulse generator before the two or more pulses are delivered to the second node, and the second coil provides a signal at the port based on the two or more pulses and the delayed two or more pulses.

In an aspect of the subject technology, the first node is a positive node and the second node is a negative node, and the signal is proportional to a difference of a first voltage applied to the positive node and a second voltage applied to the negative node. In an aspect of the subject technology, the second coil of the transformer generates the signal that is proportional to a subtraction of the delayed two or more pulses from the two or more pulses. In an aspect of the subject technology, the transmitter interface further includes a first capacitor and a second capacitor. The first capacitor is coupled between the pulse generator and the first node of the first coil, the second capacitor is coupled between the delay module and the second node of the first coil, and the signal has no DC component. In an aspect of the subject technology, the time delay is equal to a half of the first period. In an aspect of the subject technology, the two or more pulses have a first frequency and the time delay is selected to minimize frequency components of the output signal about twice the first frequency.

According to aspects of the subject technology, a device includes a transformer that includes a first coil and a second coil and a signal sampler module to receive a first signal. The signal sampler module provides two or more sampled pulses of the first signal. The transmitter interface also includes a delay module coupled between the signal sampler module and the first coil. The delay module applies a delay to the two or more sampled pulses to generate a delayed two or more sampled pulses. The transmitter interface further includes a port coupled to the second coil. A second signal at the second coil is proportional to the delayed two or more sampled pulses subtracted from the two or more sampled pulses.

In an aspect of the subject technology, the first signal is a narrowband signal with frequency components centered around a first frequency and with no DC component. In an aspect of the subject technology, the delay is an odd multiple of half a period of the first frequency. In an aspect of the subject technology, the signal sampler module samples the first signal at the first frequency. In an aspect of the subject technology, the first coil includes a first node and a second node. The first node is a positive node and the second node is a negative node. The two or more sampled pulses of the first signal are provided at the positive node and the delayed two or more sampled pulses are provided at the negative node. An input signal of the transformer at the first coil is the delayed two or more sampled pulses subtracted from the two or more sampled pulses. In an aspect of the subject technology, the transformer is one to one and the second signal at the second coil is equal to the input signal of the transformer. The second signal has no frequency components around twice the first frequency. In an aspect of the subject technology, the delay module is a flip flop.

According to aspects of the subject technology, a transmission system includes a filter and a device that includes a transformer that comprises a first coil and a second coil. The transmission system also includes a signal sampler module to sample, at a first frequency, a signal received by the signal sampler module. The signal sampler module is coupled to a first node to provide a plurality of sampled pulses of the signal at the first node. The first node is coupled to a second node of the first coil, and the first node is coupled via a first flip flop having a first clock signal with the first frequency to a third node of the first coil. The first flip flop provides a delay of half a period of the first frequency for the plurality of sampled pulses.

In an aspect of the subject technology, the device further includes a second flip flop having a second clock signal with the first frequency coupled between the signal sampler module and the first node to synchronize the plurality of sampled pulses with the second clock signal. In an aspect of the subject technology, the first clock signal is a complement of the second clock signal to produce the delay for the plurality of sampled pulses. In an aspect of the subject technology, the device further includes first and second NOT gates coupled between the first node and the second node of the first coil and third and fourth NOT gates coupled between the first flip flop and the third node of the first coil. In an aspect of the subject technology, the filter is coupled to the second coil and the filter generates a reconstructed signal from the signal. In an aspect of the subject technology, the transmission system further includes a first capacitor coupled between the first node and the second node of the first coil. In an aspect of the subject technology, the transmission system further includes a second capacitor coupled between the first flip flop and the third node of the first coil.

Those of skill in the art would appreciate that the various illustrative blocks, modules, elements, components, memory systems, and algorithms described herein may be implemented as electronic hardware, computer software, or combinations of both. To illustrate this interchangeability of hardware and software, various illustrative blocks, modules, elements, components, memory systems, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks should be performed. Any of the blocks may be simultaneously performed. In one or more implementations, multitasking and parallel processing may be advantageous. Moreover, the separation of various system components in the embodiments described above should not be understood as requiring such separation in all embodiments, and it should be understood that the described program components and systems could generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the term "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" and "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject but rather are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as "an aspect," "the aspect," "another aspect," "some aspects," "one or more aspects," "an implementation," "the implementation," "another implementation," "some implementations," "one or more implementations," "an embodiment," "the embodiment," "another embodiment," "some embodiments," "one or more embodiments," "a configuration," "the configuration," "another configuration," "some configurations," "one or more configurations," "the subject technology," "the disclosure," "the present disclosure," and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as "an aspect" or "some aspects" may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skilled in the art are expressly incorporated herein by reference and are intended to be encompassed by the claims. Moreover, nothing disclosed herein is intended to be dedicated to the public, regardless of whether such disclosure is explicitly recited in the claims. No claim element is to be construed under the provisions of 35 U.S.C. § 112(f) unless the element is expressly recited using the phrase "means for" or, in the case of a memory system claim, the element is recited using the phrase "step for."

The previous description is provided to enable any person skilled in the art to practice the various aspects described herein. Various modifications to these aspects would be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
    a port;
    a transformer comprising:
        a first coil that comprises a first node and a second node; and
        a second coil coupled to the port;
    a pulse generator coupled to the first node, wherein the pulse generator is configured to generate two or more pulses with a first period on the first node; and
    a delay module coupled between the second node of the first coil and the pulse generator, wherein the delay module is configured to generate a delayed two or more pulses by applying a time delay to the two or more pulses of the pulse generator before the two or more pulses are delivered to the second node, and wherein the second coil is configured to provide a signal at the port based on the two or more pulses and the delayed two or more pulses.

2. The device of claim 1, wherein the first node is a positive node and the second node is a negative node, and wherein the signal is proportional to a difference of a first voltage applied to the positive node and a second voltage applied to the negative node.

3. The device of claim 1, wherein the second coil of the transformer is configured to generate the signal that is proportional to a subtraction of the delayed two or more pulses from the two or more pulses.

4. The device of claim 1, further comprising:
a first capacitor and a second capacitor, wherein:
the first capacitor is coupled between the pulse generator and the first node of the first coil,
the second capacitor is coupled between the delay module and the second node of the first coil, and
the signal has no DC component.

5. The device of claim 1, wherein the time delay is equal to a half of the first period.

6. The device of claim 1, wherein the two or more pulses have a first frequency and the time delay is selected to minimize frequency components of the signal about twice the first frequency.

7. A device, comprising:
a transformer that comprises a first coil and a second coil;
a signal sampler module configured to receive a first signal, wherein the signal sampler module is configured to provide two or more sampled pulses of the first signal;
a delay module coupled between the signal sampler module and the first coil, wherein the delay module is configured to apply a delay to the two or more sampled pulses, thereby generate a delayed two or more sampled pulses; and
a port coupled to the second coil, wherein a second signal at the second coil is proportional to the delayed two or more sampled pulses subtracted from the two or more sampled pulses.

8. The device of claim 7, wherein the first signal is a narrowband signal with frequency components centered around a first frequency and with no DC component.

9. The device of claim 8, wherein the delay is an odd multiple of half of a period of the first frequency.

10. The device of claim 8, wherein the signal sampler module is configured to sample the first signal at the first frequency.

11. The device of claim 8, wherein the first coil comprises a first node and a second node, wherein the first node is a positive node and the second node is a negative node, wherein the two or more sampled pulses of the first signal are provided at the positive node and the delayed two or more sampled pulses are provided at the negative node, and wherein an input signal of the transformer at the first coil is the delayed two or more sampled pulses subtracted from the two or more sampled pulses.

12. The device of claim 11, wherein the transformer is one to one, wherein the second signal at the second coil is equal to the input signal of the transformer, and wherein the second signal has no frequency components around twice the first frequency.

13. The device of claim 7, wherein the delay module is a flip flop.

14. A transmission system, comprising:
a filter; and
a device comprising:
a transformer that comprises a first coil and a second coil; and
a signal sampler module configured to sample, at a first frequency, a signal received by the signal sampler module, wherein:
the signal sampler module is coupled to a first node and is configured to provide a plurality of sampled pulses of the signal at the first node,
the first node is coupled to a second node of the first coil, and
the first node is coupled via a first flip flop having a first clock signal with the first frequency to a third node of the first coil, wherein the first flip flop is configured to provide a delay of half a period of the first frequency for the plurality of sampled pulses.

15. The transmission system of claim 14, wherein the device further comprising:
a second flip flop having a second clock signal with the first frequency coupled between the signal sampler module and the first node and configured to synchronize the plurality of sampled pulses with the second clock signal.

16. The transmission system of claim 15, wherein the first clock signal is a complement of the second clock signal to produce the delay for the plurality of sampled pulses.

17. The transmission system of claim 14, wherein the device further comprising:
first and second NOT gates coupled between the first node and the second node of the first coil; and
third and fourth NOT gates coupled between the first flip flop and the third node of the first coil.

18. The transmission system of claim 14, wherein:
the filter is coupled to the second coil; and
the filter is configured to generate a reconstructed signal from the signal.

19. The transmission system of claim 14, further comprising:
a first capacitor coupled between the first node and the second node of the first coil.

20. The transmission system of claim 19, further comprising:
a second capacitor coupled between the first flip flop and the third node of the first coil.

* * * * *